United States Patent [19]

Wessel et al.

[11] 4,174,694
[45] Nov. 20, 1979

[54] FUEL INJECTION CONTROL SYSTEM

[75] Inventors: Wolf Wessel, Oberriexingen; Wilfried Sautter, Ditzingen, both of Fed. Rep. of Germany

[73] Assignee: Robert Bosch GmbH, Stuttgart, Fed. Rep. of Germany

[21] Appl. No.: 847,364

[22] Filed: Oct. 31, 1977

[30] Foreign Application Priority Data

Nov. 2, 1976 [DE] Fed. Rep. of Germany ....... 2650246

[51] Int. Cl.$^2$ ............................................. F02M 59/20
[52] U.S. Cl. ........................ 123/140 MC; 123/32 EA
[58] Field of Search ............... 123/140 MC, 140 MP, 123/140 VS, 140 FP, 140 A, 140 FG, 139 BG, 32 EA, 32 ER, 32 J, 32 AE, 100, 123, 122 H

[56] References Cited

U.S. PATENT DOCUMENTS

| 2,925,066 | 2/1960 | Thorner | 123/140 FP |
| 3,973,537 | 8/1976 | Williams et al. | 123/140 MC |
| 3,973,538 | 8/1976 | Williams et al. | 123/140 MC |
| 3,981,287 | 9/1976 | Williams et al. | 123/32 EA |

Primary Examiner—Gerald Brigance
Attorney, Agent, or Firm—Edwin E. Greigg

[57] ABSTRACT

A control system for the fuel injection mechanism of an internal combustion engine, especially a Diesel engine. In order to adapt the fuel admitted to the engine to exact requirements, a correction is made on the basis of air mass flow rate and fuel temperature. The air mass flow rate is deduced from signals generated by an air temperature sensor and an air pressure sensor while the fuel temperature is taken by a fuel temperature sensor. The two temperature signals are applied to a bridge circuit which feeds a differential amplifier whose output is mixed with the pressure signal. The composite mixed signal is applied to a servo-mechanism to limit the excursion of the fuel control rack of the fuel injection pump. Status indicators generate feedback signals for comparison with set-point signals to provide closed-loop control.

9 Claims, 4 Drawing Figures

FUEL INJECTION CONTROL SYSTEM

The present application is related to the co-pending application Ser. No. 847,365 whose descriptive contents are expressly incorporated by this reference.

BACKGROUND OF THE INVENTION

The invention relates to a fuel injection system for internal combustion engines. More particularly, the invention relates to a fuel injection system for a Diesel engine in which a high-pressure fuel injection pump is equipped with compensating mechanisms operating under servo control of an electronic controller. The electronic controller takes into account one or several engine variables to adjust the fuel injection mechanism to account for the magnitude of engine variables such as, for example, engine temperature. There are known in the art control mechanisms for changing the adjustment of a fuel injection pump on the basis of temperature or for limiting the position of a member within the fuel injection pump of a Diesel engine on the basis of operational variables such as air temperature. The known control systems use the signal related to air temperature to perform an additive correction of the position which is set within the fuel injection pump, i.e., the position of the fuel control rack is adjusted by an amount related to the air temperature. However, the increasingly rigorous laws relating to exhaust gas emissions cannot be satisfied with mechanisms of this type which base their correction on a single engine variable. In order to permit the correct mixture of air and fuel, it is required urgently to perform a compensation on the basis of both air and fuel temperature.

OBJECT AND SUMMARY OF THE INVENTION

It is thus a principal object of the invention to provide a fuel injection pump for Diesel engines in which the fuel control rack is servo-controlled to limit the maximum amount of fuel admitted to the engine on the basis of air temperature and fuel temperature data. In this way, clean combustion within the Diesel engine is insured even when the differences of temperature between the air and the fuel are considerable.

It is a more particular object of the invention to provide a fuel injection pump including a servo control in which the signals related to induction tube air temperature and fuel temperature are fed into a bridge circuit which feeds the input of a differential amplifier which is connected to the overall electronic control circuit for the fuel injection system.

It is still another object of the invention to provide a fuel injection pump which can be controlled by an electronic controller that contains a set of data relating basic engine variables to the amount of fuel and wherein this electronic control system can be corrected by the bridge circuit of the invention without affecting the basic characteristic function of the electronic controller.

The invention will be better understood as well as further objects and advantages thereof become more apparent from the ensuing detailed description of exemplary embodiments depicting the invention.

DESCRIPTION OF THE PREFERRED EMBODIMENTS

Figure 1:
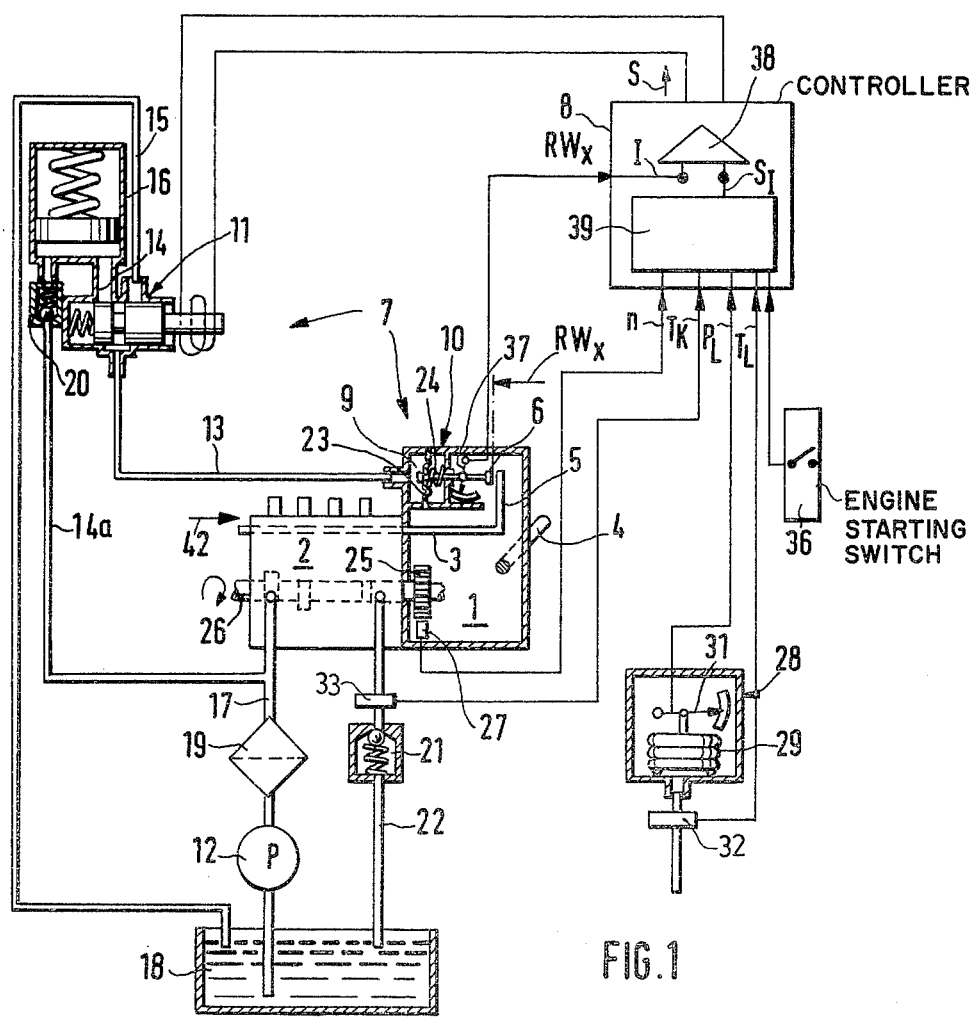
FIG. 1 is a schematic illustration of a first exemplary embodiment of the invention.

Turning now to FIG. 1, there will be seen a schematic illustration of a control system according to the invention including a fuel injection pump 2 whose basic operation is controlled by a mechanical speed governor 1 and which has a movable fuel rack 3 which is adjusted in known manner, not shown, by the speed governor 1 in dependence on the engine speed. The pump also includes an operating lever 4 for external adjustment of the amount of fuel to be injected by the pump 1. In the exemplary embodiment illustrated, the control rack 3 has a limiting stop arm 5 which cooperates with a stop 6 of a servo control member 7. The servo control member 7 is under the control of an electronic control circuit 8 and substantially includes a hydraulic servo motor 10 having a pressure chamber 9 and coupled with a solenoid valve 11 which controls the flow of fuel used as a control medium in its passage from a low pressure presupply pump 12 to the pressure chamber 9. The magnetic valve 11 is a spool valve having an intermediate position in which, as shown in the illustration, a line 13 is blocked from communicating with either one of a supply line 14 and a return line 15. The use of a solenoid spool valve 11 is advantageous with respect to the commonly used pulse control valves in that it conserves control fluid. A surge chamber 16 is connected to the supply line 14 in order to compensate for pressure fluctuations and to permit rapid control processes. The surge chamber 16 is connected via a check valve 20 to a line 14a which is part of the supply line 14 and which branches off from the low pressure supply line 17 through which the low pressure pump 12 aspirates fuel from a tank 18 and delivers it through a filter 19 to the sump of the high pressure injection pump 2. The presence of the check valve 20 prevents a drainage of the storage chamber 16. Any excess fuel flows through a pressure maintenance or pressure control valve 21 via a line 22 to the tank 18. The servo control member which cooperates with the solenoid valve 11 and which, in this exemplary embodiment, is a hydraulic servo motor 10, includes a flexible diaphragm 23 which defines the pressure chamber 9 into which is admitted the fuel flowing through the valve 11 via the line 13. The opposite side of the diaphragm is loaded by a return spring 24 which is supported by the housing of the servo motor 10. Fixedly attached to the diaphragm 23 is a stop member 6 whose position is determined by the solenoid valve 11 as controlled by the electronic control circuit 8 and which represents the position of maximum fuel supply of the control rack 3 of the injection pump 2. The control circuit 8 sets the position of the stop 6 on the basis of a variety of engine variables, for example the engine speed "n", the induction tube air temperature $T_L$ and the fuel temperature $T_K$ as well as on the basis of a signal related to the induction tube air pressure $P_L$ which is a measure of the amount of air fed to the engine. The latter three variables play the most significant role in performing the function of limiting the maximum fuel quantity $Q_{max}$ in the present example.

The engine speed "n" is sensed by a mechanism which includes a gear 25 mounted on the camshaft of the injection pump 2 which cooperates with an rpm sensor 27 that provides an rpm-related signal to the electronic control circuit 8. The absolute induction tube air pressure $P_L$ is transduced by an absolute pressure sensor 28 which feeds an appropriate control signal into the electronic control circuit 8.

The pressure sensor 28 includes substantially a pressure transducer 29 that includes a number of evacuated chambers and an electric position indicator 31. The electronic control circuit also receives signals from an induction air temperature sensor 32 and a fuel temperature sensor 33 as well as from an engine starting switch 36 and a position indicator 37 which provides a feedback signal to the control circuit 8 indicating the position $RW_x$ of the stop member 6.

The position indicator 37 is required in order to provide a feedback signal related to the actual position taken by the stop member 6. An open loop, forward control would not be of sufficient precision to set the servo member 7 in the desired manner. In order to perform the indicated feedback operation, the electronic control circuit 8 includes an electronic control amplifier, preferably having PID control characteristics, indicated in the circuit by the symbol 38 and described in greater detail below. The control amplifier 38 generates a control signal S which actuates the solenoid valve 11 until the actual value indicated by the position sensor 37 is equal to the nominal, set-point value generated by a circuit 39. The circuit 39 includes known components and is a portion of the overall control circuit 8 and is thus shown merely schematically by a box within the control circuit 8. An arrow 42 indicates the direction which the control rack 3 takes to shut off the engine.

The control circuit 39 within the overall controller 8 may include a set of data relating the full-load position of the control rack to various engine parameters, for example the instantaneous rpm "n" based on the signal from the rpm sensor 27 and the signal of the air flow indicator as measured by the absolute pressure sensor 28. Such an operation would correspond to a full-load control and would generate a set-point signal $S_I$ related to the position $RW_x$ of the stop member 9 so as to limit, for example, the amount of visible smoke or to control the acceleration of the engine, due consideration being given to the particular characteristics of the engine in which the pump is used. The method and apparatus of controlling an engine on the basis of characteristic data as indicated above is described for example in the Applicants' copending patent application.

As previously mentioned, the maximum fuel quantity to be admitted properly depends not only on the induction tube pressure $P_L$ but also on the induction tube air temperature $T_L$. In order to thus determine the mass flow rate of air, the electronic control circuit 39 shown in FIG. 1 performs a multiplicative combination of the air pressure signal $P_L$ with the air temperature signal $T_L$ in order to compensate for the substantial changes in the correct fuel quantity Q and thus the proper control path $R_W$ of the control rack 3 for various temperature changes.

It is a principal feature of the present invention that the control process takes into account yet another variable, i.e., the fuel temperature $T_K$ whose effect is used by the electronic control circuit 39 in a manner substantially opposite to the signal related to the induction tube air temperature $T_L$. A particularly useful and simple circuit which can perform this correlation will now be described, reference being made to FIGS. 2-4.

Figure 2:
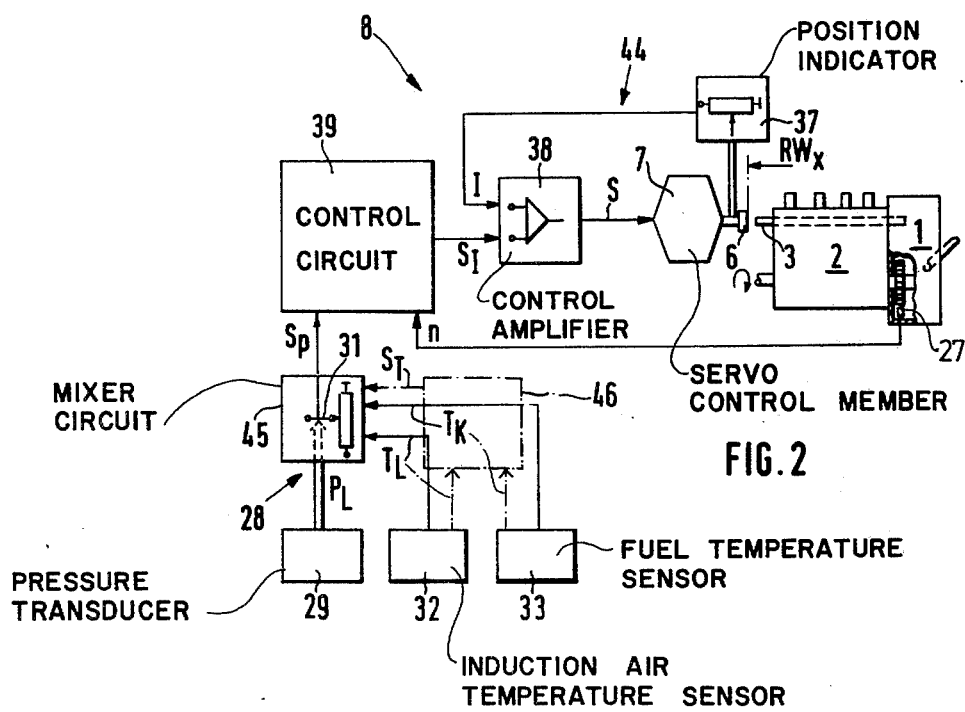
FIG. 2 is a simplified circuit diagram depicting portions of the exemplary embodiment shown in FIG. 1.

FIG. 2 is a diagram illustrating the electronic controller 8 including a control amplifier 38 and the previously referred-to control circuit 39 associated with the various sensors and transducers, the servo member 7 and also shown in association with the fuel injection pump 2 including the governor 1, all interconnected to illustrate a second exemplary embodiment of the invention. In this embodiment, the stop member 6 of the servo member 7 has a direct effect on the position of the control rack 3 of the pump 2. However, the general function of these parts is exactly the same as that of the exemplary embodiment shown in FIG. 1.

The left side of FIG. 2 generally shows the various transducers and the electronic control circuit 39 while the right part of the figure shows an electronic feedback circuit 44 which includes the servo member 7 and its stop member 6. It also includes a control amplifier 38 and the path indicator 37 which generates a feedback signal related to the position of the $RW_x$ of the stop 6. The rpm transducer 27 is associated with the governor 1 and its rpm-related signal "n" is transformed in known manner by circuitry within the control circuit 9 to produce an rpm-dependent control signal which is then used to address a full-load characteristic data set generator within the control circuit 39.

The electronic control circuit 39 generates a setpoint signal $S_I$ in dependence on the rpm signal "n" generated by the transducer 27 and a further signal $S_P$ generated by the absolute pressure sensor 28. The signal $S_P$ is produced by the electric path transducer 39 in proportion to the pressure signal $P_L$ of the pressure sensor 29. A mixer circuit 45 corrects the signal $S_P$ on the basis of further signals $T_L$ and $T_K$ generated as previously described by the induction air temperature sensor 32 and the fuel temperature sensor 33. The mixing of the signals $P_L$ and $T_L$ respectively from the pressure sensor 29 and the air temperature sensor 32 takes place in multiplicative fashion. This combination is performed by changing the supply voltage for the electric path sensor 31 which is a part of the coupling circuit 45 as a function of the induction tube air temperature $T_L$ as sensed by the air temperature sensor 32, thereby causing a multiplication of the two signals in the arithmetic sense. An additive coupling, i.e., where one signal would be merely added to the other, would lack the precision required for the demands made on this type of control in modern engines.

The mass of fuel delivered by the injection pump is a function of temperature for constant pressure and volume. Accordingly it is desirable to perform a correction for this change of mass by correcting the supply voltage of the electric path sensor 31 additionally on the basis of a signal from the fuel temperature sensor 33. Its control signal $T_K$ is connected to oppose the control signal $T_L$ from the air temperature sensor 32. This opposite connection accounts for the fact that when the fuel and air have the same temperature it is normally not required to correct the control signal $S_P$.

The multiplicative mixing of the two signals $T_L$ and $T_K$ with the signal $P_L$ may take place advantageously within the bridge circuit 46 which will be explained in greater detail with the aid of FIGS. 3 and 4 and which is shown dashed in FIG. 2. The output signal of the bridge circuit 46 is designated $S_T$ and is used in place of the signals $T_L$ and $T_K$ as the signal which corrects the supply voltage of the absolute pressure sensor 28 and is fed to the mixing circuit 45.

Figure 3:
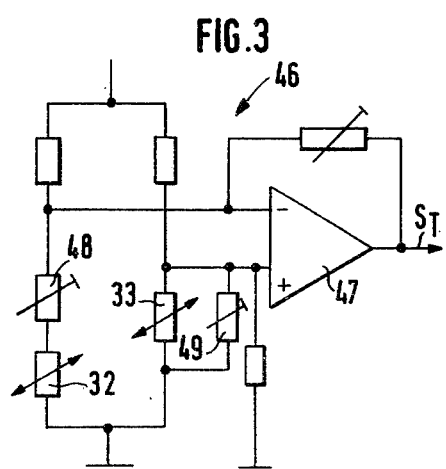
FIG. 3 is a schematic diagram of a bridge circuit for use in the system of the invention.
Figure 4:
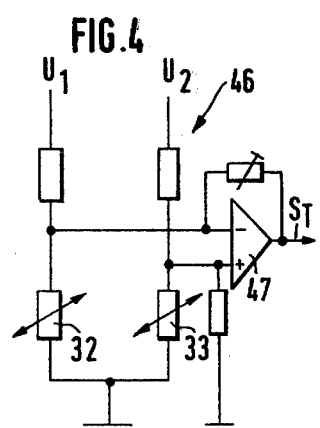
FIG. 4 is another circuit diagram of a bridge circuit which may be used in the invention.

The multiplicative mixing of the signal $T_L$ related to the induction tube air temperature and the signal $T_K$ related to fuel temperature which is shown in simplified manner in FIG. 2 in dashed lines is actually performed by a bridge circuit 46 illustrated in further detail in FIG. 3. Each branch of the bridge includes a temperature sensor, respectively sensors 32 and 33, and the bridge circuit is connected to the input of a differential amplifier 47 which is embodied as a proportional amplifier having an adjustable amount of amplification. The sensors 32 and 33 are respectively connected to trimmer resistors 48 and 49 and are preferably NTC resistors. In order to balance the two halves of the bridge, they may also be connected to separate voltage supply sources $U_1$ and $U_2$ as shown in FIG. 4. The output signal $S_T$ from the differential amplifier 47 may be used to correct the control signal S of the control amplifier 38 by direct connection to the electronic control circuit 39. However the most effective and most cost-effective manner of construction is, as indicated in FIG. 2, to use the output signal $S_T$ of the differential amplifier 47 to correct the supply voltage for the path indicator 31 contained within the absolute pressure sensor 28 and this is done in the mixing circuit 45.

In experiments and measurements on actual engines, it has been demonstrated that the pressure signal $P_L$ need not be corrected for air and fuel temperature changes if these two temperatures are the same. For this reason, the bridge circuit 46 in FIGS. 3 and 4 is so constructed that when the temperature of the induction tube air and the fuel are the same, then the differential voltage fed to the differential amplifier 47 will be zero. However, if a small amount of correction is desired, the bridge circuit 46 may be adjusted to provide a small differential voltage even when the temperatures are equal.

The above-described invention in terms of the two exemplary embodiments illustrated relates to a correction or compensation of the setting of a fuel rack on the basis of induction tube air temperature and fuel temperature by limiting the degree to which the fuel rack 3 of an injection pump 2 may be moved in the direction of increasing injected fuel. The same mechanism and circuitry may also be used if the controller which contains the electronic circuit 8 includes an electronic feedback control circuit which automatically sets the position of the fuel rack for all operational domains of the engine with or without the use of a mechanical speed governor. It is a particular advantage of the invention that the use of a bridge circuit makes it possible to use a single amplifying circuit to perform two distinct compensations for temperature changes, i.e., a compensation for the temperature of the induction tube air and a further compensation for the temperature of the fuel aspirated by the pump.

The foregoing relates to preferred exemplary embodiments of the invention, it being understood that other embodiments and variants thereof are possible within the spirit and scope of the invention.

What is claimed and desired to be secured by Letters Patent of the United States is:

1. A control system for use in association with a fuel injection pump of an internal combustion engine, said injection pump having a fuel rack, said control system including control means for positioning the travel of said fuel rack and further including a servo-mechanism for determining the position of said control means, said servo-mechanism including an electronic controller connected to receive engine-related signals to thereby set the position of said control means, and wherein the improvement comprises:

a first transducer, disposed to experience the temperature of the air aspirated by the engine for generating a first signal related to the induction air temperature;

a second transducer, disposed to experience the temperature of the fuel delivered to said pump for generating a second signal related to the fuel temperature;

an electrical circuit for receiving said first and second signals and for providing a composite signal related to the difference of said first and second signals, said composite signal being applied to said electronic controller to thereby correct the control of the position of said servo-mechanism and said control means; whereby the amount of fuel admitted to said engine is limited.

2. A control system as defined by claim 1, wherein said electrical circuit for receiving said first and second signals includes a bridge circuit which feeds a differential amplifier, and wherein said composite signal is the output signal of said differential amplifier which is fed to said electronic controller.

3. A control system as defined by claim 2, wherein said first and second transducers are preferably NTC resistors which are so dimensioned and so positioned that when the temperature of said aspirated air and the temperature of said fuel are equal, the output voltage from said bridge circuit applied to said differential amplifier is a predetermined constant value.

4. A control system as defined by claim 2, further comprising a trimmer resistor connected to each of said first and second transducers.

5. A control system as defined by claim 2, wherein said bridge circuit is connected to two different sources of potential.

6. A control system as defined by claim 2, further comprising a third transducer disposed to experience and measure the absolute air pressure in the induction tube of said engine and to generate a signal related thereto which is applied to said electronic controller.

7. A control system as defined by claim 6, further comprising a mixing circuit for mixing the signal from said differential amplifier with said signal from said third transducer.

8. A control system as defined by claim 6, wherein said third transducer includes a status indicator for generating a signal related to the status of said third transducer and wherein the output of said differential amplifier is used to correct the supply voltage of said status indicator.

9. A control system as defined by claim 1, wherein said electrical circuit for receiving said first and second signals includes a bridge circuit which is connected to the input of a differential amplifier having proportional amplification characteristics and adjustable gain.

* * * * *